Figure 1:
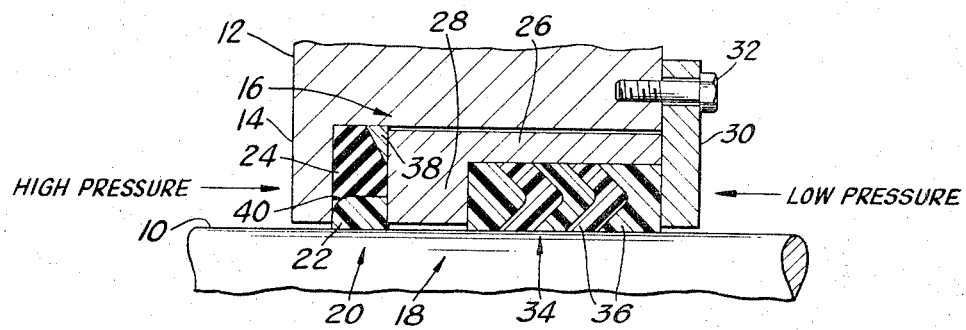

Nov. 7, 1967   P. R. SHEPLER   3,351,350
HIGH PRESSURE ROD SEAL
Filed June 22, 1966

INVENTOR.
PAUL R. SHEPLER
BY Boyce C. Dent
his Attorney

United States Patent Office 3,351,350
Patented Nov. 7, 1967

3,351,350
HIGH PRESSURE ROD SEAL
Paul R. Shepler, Towson, Md., assignor to Koppers Company, Inc., a corporation of Delaware
Filed June 22, 1966, Ser. No. 559,450
3 Claims. (Cl. 277—58)

This invention relates generally to fluid sealing devices and more particularly to improvements to resilient type seals of the type disclosed in my copending application Ser. No. 405,124, filed Oct. 20, 1964 now Patent No. 3,300,225.

As pointed out in the foregoing application, where differential pressure zones exist, as in the case of a pump or actuator, and a reciprocating or rotating rod extends through the pressure zones, a seal must be provided for the rod to prevent the escape of fluid in the high pressure zone to the low pressure zone. Usually a cavity is made in the housing separating the zones and a seal assembly is placed in the cavity and surrounding the rod. Generally, the sealing efficiency of the assembly is governed by two factors; the sealing material and the pressure exerted by the sealing material against the rod. Leakage of the fluid, either liquid or gas, between the seal and the rod is minimized by radially squeezing the sealing material against the rod. Increasing the pressure of the sealing material against the rod, of course, increases the friction between the two. Rotation and/or reciprocation of the rod must not be unduly retarded by this friction and the seal must have good resistance to wear that may be engendered by the friction.

As the capacity of modern machines is increased, it becomes necessary to seal higher and higher pressures. For example, reciprocating rams used on heavy earthmoving equipment now develop pressures that have been found to pulsate from zero to five thousand pounds per square inch. While the seal disclosed in the above-mentioned application has proven to be satisfactory for sealing pulsating pressures from zero to 3,000 p.s.i., it does not give satisfactory performance in sealing pressures pulsating up to 5,000 p.s.i. By satisfactory performance is meant that the seal will have an average life expectancy in excess of 300,000 cycles with a leakage rate less than 0.1 cubic centimeter per hour per 1000 p.s.i. pressure. For example, the leakage should not exceed 0.5 cubic centimeter per hour for pulsating pressures up to 5000 p.s.i. The seal is said to fail when the leakage exceeds this amount.

The present invention provides a simple and effective seal capable of giving satisfactory performance at pressures up to 5000 p.s.i. In accordance with this invention, sealing of the desired pressure is accomplished by placing a seal utilizing two sealing portions in a cavity surrounding a rod. The first portion is similar to that disclosed in the above-mentioned application and consists of surrounding the rod with a ring of plastic material such as polytetrafluoroethylene, which ring is surrounded by another ring of elastomeric material such as synthetic rubber and axially compressing the latter ring to effect squeezing of the polytetrafluoroethylene ring against the rod. Axial compression also causes radial displacement of the outer periphery of the rubber ring so that secondary sealing is provided between the interface of the ring and the cavity. The second sealing portion consists of a plurality of V-shaped rings located axially adjacent to the first sealing portion. The V-shaped rings are also axially compressed to effect sealing between the V-shaped rings and the rod and between the interface of the V-shaped rings and a cavity in which the V-shaped rings are placed.

The seal assembly may be packaged as a unit ready for assembly on the field.

The above and further novel features of the invention will appear more fully from the following detailed description when the same is read in connection with the accompanying drawings. It is to be expressly understood, however, that the drawings are not intended as a definition of the invention but are for the purpose of illustration only.

Figure 2:
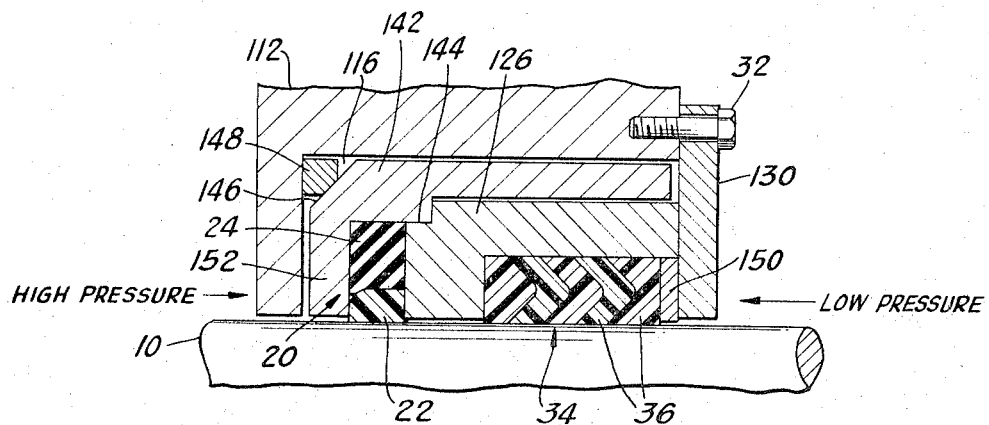

In the drawings wherein like parts are marked alike:

FIGURE 1 is a fragmentary sectional view in side elevation illustrating an embodiment of the novel seal assembly as mounted in the seal cavity of a reciprocating piston pump or actuator; and FIGURE 2 is a fragmentary sectional vew in side elevation illustrating another embodiment of the invention.

FIG. 1 illustrates a conventional reciprocating rod 10 which may be the rod of a piston (not shown). The rod projects through a housing 12 having an end portion 14 of reduced diameter surrounding the shaft 10 and a cylindrical cavity 16 substantially larger than the rod in which is placed the novel seal assembly generally designated by the number 18.

The seal 18 has a seal ring 20 which engages the flange portion 14 of the housing 12. The seal ring 20 comprises a polytetrafluoroethylene ring 22 surrounding the rod and which is itself surrounded by a ring 24 of elastomeric material, such as Buna N, to form a unitary ring. This ring is axially squeezed by a tubular casing 26 having an end portion 28 of reduced diameter bearing against the ring 20. The tubular casing 26 is urged against ring 20 by a retainer plate 30 secured to the housing 12 by bolts 32. Squeezing of the ring is accomplished by making the combined axial length of the tubular casing 26 and seal ring 20 slightly longer than the axial length of cavity 16.

The tubular casing 26 has an enlarged cavity 34 surrounding the rod 10. A plurality of V-shaped sealing rings 36 are placed in cavity 34. The outermost ring on each end of the V-shaped ring assembly has a flat radial face for engaging flange 28 and retainer plate 30 respectively. For purposes of simplicity, all of these rings are designated by numeral 36 since their functions are identical. Although any reasonable number may be used, it has been found that from four to six V-shaped rings result in optimum performance. The V-shaped rings 36 are axially squeezed in the cavity 34 by retainer plate 30 in the same manner that ring 20 is squeezed in cavity 16.

Referring now in greater detail to the first seal ring 20, the polytetrafluoroethylene ring 22 is made of a filled polytetrafluoroethylene material in accordance with the description provided in the aforementioned application. Ring 22 is substantially rectangular in cross-section with an inside diameter approximately the same as the outside diameter of the rod 10. Thus, the ring is easily mounted upon the rod prior to insertion in cavity 16.

The outer ring 24 is made from a resilient material such as synthetic rubber, the preferred type being Buna-N be-about 74, which is less than the hardness of the inner ring preferably has a $D_A$ scale Shore durometer hardness of about 74, which is less than the hardness of the inner ring 22.

The outer ring 24 is substantially rectangular in cross-section with an outside diameter approximately the same as cavity 16 so that the ring is easily inserted in the cavity. The inside diameter of the outer ring is slightly smaller than the outside diameter of the inner ring 22, preferably about 0.010 inch smaller, so that the interference tends to exert a radial compressive force on the inner ring.

Since the outer ring 24 is used to exert a radial compressive force on inner ring 22, it is preferably made slightly longer axially than the inner ring; 0.020 inch longer for example. Thus, the outer ring will be axially squeezed by flange 28 on casing 26 before the flange contacts the inner ring, and a component of the force so generated acts to compress the inner ring against the rod. Advantageously, an anti-extrusion ring 38 is provided to prevent extrusion of the outer periphery of ring 20 between the interface of tubular casing 26 and the inner periphery of cavity 16. Ring 38 is preferably tri-angular in cross-section as indicated in FIG. 1. It may be made of a hard material, such as steel, with an outside diameter just slightly smaller than the cavity 16 so that it is easily inserted in the cavity. When anti-extrusion ring 38 is used, the axial length of outer ring 24 may be shortened to compensate for the additional deformation induced by ring 38.

Tubular casing 26 is also made of a hard material, preferably cast iron so that wear is retarded between flange portion 28 and the rod 10 which is usually chrome-plated. The axial thickness of flange 28 should be great enough to withstand the compression forces (to be later described) without substantial axial distortion since such distortion would cause the ring 20 to be pressed unevenly against flange portion 14 possibly causing leakage in that area. The inside diameter of flange 28 is just slightly larger than the diameter of the rod 10 so that the tubular casing is easily placed on the rod.

As previously mentioned, radial compression of ring 20 around the rod 10 to create a seal is accomplished by making the axial length of the outer ring portion 24 and the tubular casing 26 together exceed the axial length of cavity 16. Thus, when the ring and casing are loosely inserted in the cavity, the tubular casing 26 will protrude beyond the cavity before the bolts 32 are tightened. The casing 26 will act against the ring 20 thereby compressing it against the rod, the flange 14, and the periphery of cavity 16. The axial length of the outer ring 24 may be varied to create more or less pressure as required by the particular application.

The axial length of the inner ring 22 is such that it is not usually compressed axially although slight compression is not detrimental. It is the axial compression of the outer ring that provides radial compression of the inner ring against the rod. One outer corner 40 of the inner ring is preferably removed to provide a space into which the inner periphery of the outer ring can be displaced when it is axially compressed. In addition, the rounded corner permits easier assembly of the inner ring within the outer ring, especially with the aid of a lubricant.

The V-shaped rings 36 are preferably made from neoprene impregnated duck fabric. Their combined axial length is such that the outermost ring protrudes beyond cavity 34 when they are loosely inserted in the cavity. Thus, tightening of bolts 32 will cause retainer plate 30 to axially compress the rings in cavity 34 so that they will expand into radial engagement with the rod and the cavity. It has been found that the polytetrafluoroethylene ring should be compressed about two to five times as much as the V-shaped rings. That is to say, the unit pressure between the polytetrafluoroethylene ring and the rod should be about two to five times greater than the unit pressure between the V-shaped rings and the rod. For this reason, flange 28 is provided to permit a greater compressive force against ring 20 than against V-shaped rings 36. If V-shaped rings 36 were placed directly adjacent ring 20, then retainer plate 30 would exert the same compressive force on both rings. The ratio of compressive force can be varied by controlling the length of casing 26 and cavity 34. In practice, it has been found that for good sealing retainer plate 30 should compress ring 20 about 0.020 inch and rings 36 about 0.030 inch. This amount of compression results in the desired unit pressure between the rings and the rod.

To assemble the complete seal 18, the outer ring 24 is placed around the rod 10 and pushed into the cavity 16 and against flange 14. The anti-extrusion ring 38 is then placed adjacent the outer ring facing as indicated in FIG. 1. Next, inner ring 22 is placed around the rod. It is helpful to put lubricant on the rounded corner 40. Ring 22 is then pushed along the rod until it rests against the outer ring 24. Tubular casing 26 is placed around the rod and pushed into cavity 16 with flange 28 contacting ring 22. Thereafter, the V-shaped rings 36 are placed around the rod and pushed into cavity 34 and finally retainer plate 30 is placed around the rod and against V-shaped rings 36. Bolts 32 are then threaded into housing 12. As the bolts are drawn up, inner ring 22 is forced into outer ring 24. With the bolts drawn up all the way, outer ring 24 is compressed in cavity 16 thereby squeezing inner ring 22 around the rod. Anti-extrusion ring 38 also compresses outer ring 24 contributing to the radial compression of ring 22 against the rod and ring 24 against the inner periphery of cavity 16 while preventing the extrusion of ring 24 between casing 26 and cavity 16. At the same time, V-shaped rings 36 are compressed in cavity 34 and are squeezed against the rod 10 and the inner periphery of cavity 34. Thus, both dynamic and static sealing are accomplished.

As an illustration of the utility of this invention, laboratory tests have been made under the following conditions and with results as indicated. The seal was made to fit a 2½ inch diameter rod reciprocating at 15–20 cycles per minute at a temperature of 100°–190° F. Hydraulic oil at a pressure pulsating from zero to 5000 p.s.i. at each cycle of reciprocation was sealed. The overlength of seal ring 20 was 0.015–0.020 inch and the overlength of V-shaped rings 36 was 0.025–0.030 inch resulting in a friction load of about 1000 pounds on the rod. Less than 0.5 cubic centimeter per hour leakage occurred for a period of 300,000 cycles of the rod. Failure had not occurred at the end of this test, failure being defined as leakage greater than 0.5 cubic centimeter per hour.

Another embodiment of the invention is shown in FIG. 2. In this embodiment the seal assembly 18 is placed in an outer tubular casing 142 having an end portion 152 of reduced diameter to provide a unitary assembly to facilitate preassembly of the seal components at the factory and to provide ease of handling. In this embodiment, tubular casing 126 has a shoulder portion 144 which is press fitted into the outer casing 142. Thus, anti-extrusion ring 38 may be eliminated. In addition, to provide secondary sealing between the outer casing 142 and cavity 116, the outer casing preferably has a bevelled edge 146 which is pressed against a copper ring 148 set in the cavity 116 as shown. Before assembly, the cross-section of the copper ring is square. However, the corner touching the bevelled edge 146 of the outer casing is deformed when retainer plate 130 is drawn into place by bolts 32.

To complete the unitary assembly, retainer ring 150 is press fitted into inner casing 126 to compress the V-shaped rings 36 in cavity 34. The outermost end of outer casing 142 (on the right-hand side of FIG. 2) does not extend as far as the outermost end of inner casing 126. Thus, retainer plate 130 urges inner casing 126 against outer casing 142 which in turn presses copper ring 148 against cavity 116 to effect static sealing.

Preassembly at the factory is preferably only partially completed so that the inner diameters of seal rings 20 and 36 are not fully compressed so as to make assembly to the rod difficult. For example, the shoulder portion 144 of inner casing 126 is partially pressed into the corresponding shoulder portion of outer casing 142. Retainer ring 150 is only partially pressed into cavity 34 of inner casing 126. Thus, final compression is accomplished by retainer plate 130 by drawing up bolts 32 at final assembly in housing 112. Otherwise, assembly of the various components is similar to that described for the embodiment of FIG. 1.

It will be apparent from the previously described operation of the seal that it is possible to satisfactorily seal a rotating and/or reciprocating rod against differential pulsating pressures up to 5000 p.s.i. Economical and simple means for maintaining compression of the sealing elements against the rod have been illustrated.

The principle, preferred construction, and mode of the operation of the invention have been explained. Although the preferred embodiment has been illustrated and described, it should be understood that, within the scope of the appended claims, the invention may be practiced otherwise than specifically set forth. For example, it is within the scope of this invention to use the seal in tandem, or to use a pair of these seals back to back to seal different fluids from one another. It is also possible to vary the amount of pressure exerted by the outer ring 24 by placing a tubular shim (not illustrated) between the outer ring and the housing 12. The seal may also be inverted. That is, the bore of the housing becomes the surface to be sealed rather than the rod. In this case, the polytetrafluoroethylene portion of ring 20 and the V-shaped rings 36 would bear against the bore and casing 26 would be axially urged along the rod rather than along the bore.

I claim:

1. A dual stage high pressure seal assembly for a rod surrounded by a cavity defined by a housing having an end portion of reduced diameter, comprising:
   a first stage that includes a seal ring having an inner portion of polytetrafluoroethylene surrounded by an outer portion of elastomeric material, said seal ring positioned around said rod and within said cavity and adjacent said housing end portion of reduced diameter;
   an inner tubular casing having an end portion of reduced diameter secured within said cavity and around said rod and urging said seal ring toward said housing end portion to squeeze said elastomeric material whereby said inner portion of polytetrafluoroethylene is compressed into sealing engagement against said rod and said housing at one unit pressure;
   a second stage having a plurality of V-shaped rings around said rod and within said tubular casing engaging said rod and said casing end portion of reduced diameter;
   biasing means urging said casing towards said seal ring a predetermined amount and urging said V-shaped rings against said casing end portion another predetermined amount whereby said seal ring is pressed into sealing engagement with said rod at a first unit pressure and said V-shaped rings are pressed into sealing engagement with said rod at a second unit pressure less than said first unit pressure; and
   an outer tubular casing within said cavity and surrounding said seal ring and said inner tubular casing to provide a unitary assembly,
   said outer casing having an end portion of reduced diameter against which said seal ring is urged by said inner casing end portion and having an inner shoulder portion against which said inner casing is urged by said biasing means whereby said unitary assembly is urged into sealing engagement with said housing by said biasing means.

2. The seal assembly of claim 1 wherein:
   a bevel is provided on said outer casing adjacent said housing end portion, and
   an auxiliary seal ring is provided for engagement with said bevel and said housing end portion to provide a secondary seal between said outer casing and said housing.

3. The seal assembly of claim 2, wherein:
   a retaining ring is provided within said inner casing adjacent the outermost of said V-shaped rings; and
   said biasing means comprises a compression ring secured to said housing around said shaft in contact with the end of said inner casing for urging said retaining ring against said V-shaped rings and said inner casing against said outer casing.

References Cited
UNITED STATES PATENTS

| | | | |
|---|---|---|---|
| 990,841 | 5/1911 | Collins | 277—104 |
| 1,780,764 | 11/1930 | Noble | 277—123 |
| 2,711,333 | 6/1955 | Rodgers | 277—105 X |
| 2,719,737 | 10/1955 | Fletcher | 277—123 X |
| 3,197,215 | 7/1965 | Hodge | 277—125 X |

FOREIGN PATENTS

| | | |
|---|---|---|
| 249,662 | 2/1964 | Australia. |
| 664,621 | 6/1963 | Canada. |

LAVERNE D. GEIGER, *Primary Examiner.*

J. S. MEDNICK, *Assistant Examiner.*